(No Model.)
B. T. BABBITT.
PROCESS OF EXTRACTING GLYCERINE AND APPARATUS THEREFOR.
No. 256,613.          Patented Apr. 18, 1882.
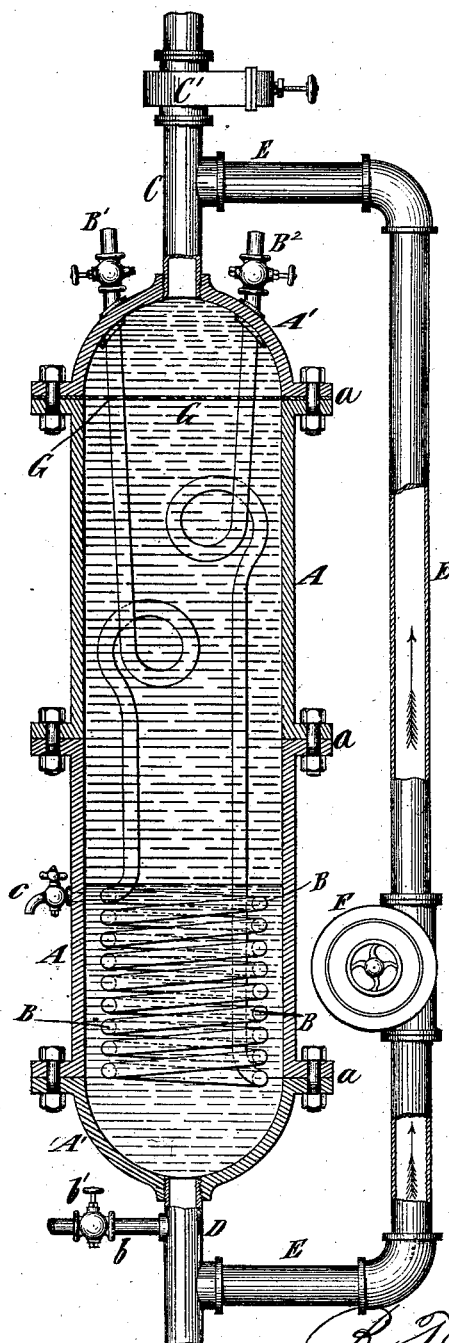

UNITED STATES PATENT OFFICE.

BENJAMIN T. BABBITT, OF NEW YORK, N. Y.

PROCESS OF EXTRACTING GLYCERINE AND APPARATUS THEREFOR.

SPECIFICATION forming part of Letters Patent No. 256,613, dated April 18, 1882.

Application filed September 21, 1881. (No model.)

*To all whom it may concern:*

Be it known that I, BENJAMIN T. BABBITT, of the city and county of New York, in the State of New York, have invented certain new and useful Improvements in the Art of Extracting Glycerine, of which the following is a specification.

My invention consists in a novel improvement in the art of extracting glycerine from fatty matter—namely, in introducing the fatty matter, with a suitable proportion of water, into a closed chamber, in heating the same, and in circulating the fatty matter and water from one end to the other of said chamber, outside the same.

In order to more speedily effect the extraction of the glycerine, I may divide the fatty matter and water into fine streams or jets by passing them through a perforated plate during their circulation.

The accompanying drawing represents a central vertical section of an apparatus for carrying out my improvement.

A designates a cylindrical chamber, which may be of any suitable size—say about twenty-five feet high and five feet in diameter. The said chamber is constructed with hemispherical ends A', and the cylindric portion thereof may be composed of two or more sections, as here shown, the several parts being provided with flanges $a$ and securely bolted together.

The chamber may be made of gun-metal, and should be strong enough to withstand an internal pressure of about two hundred pounds.

Within the chamber A is arranged a heating-coil, B, the two ends B' B² of which extend through the cylinder, and serve one as an inlet-pipe and the other as an outlet-pipe for steam.

The chamber A is provided at the top with an inlet-pipe, C, through which water and fatty matter may be introduced, and which is provided with a suitable valve, C', and at the bottom of the chamber is an outlet-pipe, D, through which the contents of the chamber may be discharged, and which is also provided with a valve. (Not here shown.) The two pipes C and D are connected by a pipe, E, which is outside the chamber A, and in said pipe E is arranged a pump, F, which may be of any suitable kind and driven in any suitable manner.

Near the top of the chamber A is a perforated partition-plate, G, which extends across the chamber, and may be secured, as here shown, between the flanges $a$ of the cylindric body A and the top head, A'.

When my apparatus is to be used a suitable quantity of water and tallow or other fatty matter is introduced into the chamber A through the pipe C, and steam is admitted to the chamber through a pipe, $b$, which enters the pipe D. Steam is also admitted to the heating-coil B, and as soon as the contents of the chamber becomes thoroughly heated the valve $b'$ in the pipe $b$ may be closed and the contents of the chamber kept at a suitable temperature by the heating-coil alone. The pump F is then set in operation, and the heated fatty matter and water are circulated continuously from the bottom of the chamber through the pipe E and into the top thereof. The pump is kept in operation for five or six hours, or until the glycerine is separated from the tallow and combined with the water, which may be readily ascertained by drawing off water through the try-cock $c$, when the pump is stopped and the contents of the chamber drawn off through the pipe D. The combined fatty matter and water are divided into fine streams or jets in passing through the perforated plate G, and the separation of the glycerine from the tallow is thereby facilitated.

I am aware that it is old to employ rotary stirrers, blades, or pipes for agitating fatty matters in a closed cylinder for extracting glycerine therefrom, and I am also aware that glycerine has been obtained by the distillation of fatty matters; and I do not claim either of the above as of my invention.

What I claim as my invention, and desire to secure by Letters Patent, is—

1. The improvement in the art of extracting glycerine, consisting in introducing fatty matter and water into a closed chamber, in heating the same, and in circulating the fatty matter and water from one end of the chamber to the other, outside the same, substantially as specified.

2. The improvement in the art of extracting glycerine, consisting in introducing fatty matter and water into a closed chamber, in heating the same, in circulating the fatty matter and water from one end of the chamber to the other, outside the same, and in dividing them into fine streams or jets during their circulation, substantially as specified.

B. T. BABBITT.

Witnesses:
HENRY T. BROWN,
FREDK. HAYNES.